United States Patent [19]

Baugher

[11] 3,968,266

[45] July 6, 1976

[54] LOW DENSITY FROZEN DESSERT

[75] Inventor: William Lewis Baugher, Logan Township, Dearborn County, Ind.

[73] Assignee: The Procter & Gamble Company, Cincinnati, Ohio

[22] Filed: Oct. 24, 1975

[21] Appl. No.: 625,735

[52] U.S. Cl. .................................. 426/566; 426/524
[51] Int. Cl.² ...................... A23G 9/02; A23G 9/04
[58] Field of Search ..................... 426/565, 566, 567

[56] References Cited
UNITED STATES PATENTS

| | | | |
|---|---|---|---|
| 2,853,391 | 9/1958 | Harrison | 426/565 |
| 3,183,098 | 5/1965 | Baur | 426/567 |
| 3,372,035 | 3/1968 | Morison | 426/567 |
| 3,800,036 | 3/1974 | Gabby et al. | 426/566 |
| 3,845,224 | 10/1974 | Moneymaker et al. | 426/566 |

Primary Examiner—Jeanette M. Hunter
Attorney, Agent, or Firm—Ronald L. Hofer

[57] ABSTRACT

A low density frozen dessert similar to commercial ice cream in texture and eating quality comprises from about 3% to about 10% protein solids, from about 10% to about 25% saccharide; from about 3% to about 15% triglyceride fat or oil, from about 0.1% to about 2% of a polyglycerol fatty acid ester emulsifier, from about 0.1% to about 2% of a fatty acid ester of an aliphatic diol having from about 3 to about 5 carbon atoms, from about 0.005% to about 0.10% of an anionic emulsifier, from about 0.005% to about 0.5% of a stabilizing system comprising citric acid or a salt thereof, tetrasodium pyrophosphate, carboxymethyl cellulose, hydroxypropyl cellulose, Lambda Carrageenan gum, and from about 55% to about 65% of water. A low density frozen dessert is made by aerating a mixture of these ingredients to a density of 0.25 to about 0.45 specific gravity and then static freezing the aerated mixture.

6 Claims, No Drawings

LOW DENSITY FROZEN DESSERT

FIELD OF THE INVENTION

This invention relates to a low density frozen dessert product containing a stabilizing system. The product is made by aerating the mixture to a low specific gravity and then freezing without aeration.

BACKGROUND OF THE INVENTION

Ice cream and frozen dessert products are marketed internationally to the many consumers who find these products desirable. Generally, these kind of products are made by commercial processors who employ a process which involves freezing the product while maintaining agitation and aeration in order to avoid the formation of large ice crystals and/or a stratified product during the process. The formation of large ice crystals or a stratified or non-homogeneous product lowers the overall quality of the product by adversely affecting the texture, mouth quality and uniformity of appearance of the frozen dessert. Thus, the normal commercial process of preparing frozen desserts involves mixing, pasteurizing and homogenizing the ingredients to form an emulsion which is then cooled with agitation with concurrent aeration and solidification to form a frozen dessert. The frozen dessert is then held at low temperatures to "harden" the product and to maintain the hard consistency. Failure to maintain the dessert at relatively low temperature, results in the development of large crystals of the sugar lactose and/or of ice, thus degrading the quality of the product.

To the consumer, one disadvantage posed by commercially made frozen desserts is the need to maintain the dessert at relatively low temperatures to avoid the deterioration of quality which results when frozen dessert products are thawed and then re-frozen. Another disadvantage is that commercial frozen dessert products may not be available when the consumer wants them and such products are difficult and expensive to store. It is apparent that it would be highly desirable to be able to make a frozen dessert product having good qualities from a shelf-stable mix by simply whipping conveniently available ingredients in a home mixer and then static freezing the aerated mixture in the freezing compartment of a home refrigerator or home freezer without agitation. It would be even more desirable if such a product could be thawed or melted and then, without aeration, re-frozen to provide a frozen dessert still having the good consistency, texture and overall appearance the product had before melting. This quality of retaining product characteristics during temperature cycling is referred to as freeze/thaw stability. One example of a product exemplifying these characteristics is the products described in U.S. patent application Ser. No. 592,208 of Hellyer et al. filed June 30, 1975, for "FROZEN DESSERT PRODUCT AND PROCESS".

In addition to the Hellyer patent application, U.S. Pat. Nos. 3,800,036, Mar. 26, 1974 to Gabby et al. and 3,183,098, May 11, 1965 to Bauer are examples of prior art in this field.

It is well known in the art that one of the problems of providing a frozen dessert composition having excellent quality is the cost of the ingredients comprising the frozen dessert mix. One means by which cost can be reduced is to minimize the quantity of ingredients employed to provide a certain volume of frozen dessert product. Thus, one of the objects of the present invention is to provide a high volume, low density frozen dessert product having good appearance, body, flavor and eating qualities.

It is another object of the present invention to provide a frozen dessert product which has a water content similar to that of commercial ice cream and yet is made by a convenient process which does not involve agitation or aeration during the freezing step.

Further objects of the present invention are to provide a product having freeze/thaw stability, to provide a frozen dessert which can be prepared in the home without employing a heating step or unusual or expensive utensils or equipment or extended whipping time, and to provide a frozen dessert made from mix ingredients which are shelf-stable.

These and still other objects will be apparent from the following description of the present invention. All percentages herein refer to percentage by weight of the total composition unless otherwise specified.

SUMMARY OF THE INVENTION

It has been discovered that a frozen dessert having good appearance, body, flavor and eating qualities can be prepared by static freezing a highly aerated frozen dessert mixture containing from about 55% to about 65% water and from about 0.05% to about 0.5% of a stabilizing system comprising five components. More specifically, the frozen dessert composition of the present invention comprises:

a. from about 3% to about 10% protein solids;
b. from about 10% to about 25% saccharides;
c. from about 3% to about 15% of a triglyceride fat;
d. from about 0.1% to about 2% of a polyglycerol fatty acid ester emulsifier;
e. from about 0.1% to about 2% of a fatty acid ester of an aliphatic diol having from about 3 to about 5 carbon atoms;
f. from about 0.005% to about 0.10% of an anionic emulsifier;
g. from about 0.05% to about 0.5% of a stabilizing system comprising:
  1. from about 5 parts to about 20 parts per 100 parts of the stabilizing system of citric acid or a salt thereof;
  2. from about 15 parts to about 35 parts per 100 parts of said stabilizing system of tetra sodium pyrophosphate;
  3. from about 25 parts to about 65 parts per 100 parts of the said stabilizing system of carboxymethylcellulose;
  4. from about 10 parts to about 30 parts per 100 parts of said stabilizing system of hydroxypropyl cellulose; and
  5. from about 5 parts to about 20 parts per 100 parts of said stabilizing system of Lambda Carrageenan gum;
h. from about 55% to about 65% water.

The frozen dessert can be made by the following process (all percentages are by weight of the total composition):

a. making an emulsion by the steps of
  1. melting from about 0.1% to about 2% of a polyglycerol fatty acid ester with from about 0.005% to about 0.10% of an anionic emulsifier;
  2. dispersing the melt of step (1) with high shear and cooling to below the crystal melting point of said melt into an aqueous medium of at least twice the weight of said melt, said aqueous medium comprising from 0 to about 25% saccharides; and 3. emulsifying from about 3% to about 15% of a triglyceride fat into the aqueous dispersion of (2); said triglyceride fat containing from 0.1% to about 2% of a fatty acid ester of an aliphatic diol having from 3 to 5 carbon atoms;

b. mixing said emulsion of step (a) with: from about 3% to about 10% of protein solids, a sufficient amount of triglyceride fat to comprise from about 3% to about 15% of the total composition, a sufficient amount of water to comprise from about 55% to about 65% of the total composition, a sufficient amount of saccharide to comprise from about 10% to about 25% of the total composition, and from about 0.05% to about 0.5% of a stabilizing system comprising:

1. from about 5 parts to about 20 parts per 100 parts of said stabilizing system of citric acid or a salt thereof;
2. from about 15 parts to about 35 parts per 100 parts of said stabilizing system tetrasodium pyrophosphate;
3. from about 25 parts to about 65 parts per 100 parts of said stabilizing system of carboxymethyl cellulose;
4. from about 10 parts to about 30 parts per 100 parts of said stabilizing system of hydroxypropyl cellulose;
5. from about 5 parts to about 20 parts per 100 parts of said stabilizing system of Lambda Carrageenan gum;

c. aerating the mixture of step (b) to a density of from about 0.25 to about 0.45 specific gravity; and
d. freezing the aerated mixture of step (c).

While static freezing is desirable from the consumer's point of view, large ice crystals tend to form during the freezing process. One method of reducing the formation of ice crystals is to formulate a product having a relatively low proportion of water and a correspondingly high proportion of solids. Increasing the solids content, however, tends to make the frozen product either too sweet or too gummy. Thus, it would be desirable to formulate a product characterized by relatively high water content which can be frozen under static conditions without forming large ice crystals which decrease the quality of the product.

The present invention provides such a relatively high water content product, a frozen dessert having a water content of from about 55% to about 65% which can be frozen under static conditions without the formation of undesirable large ice crystals. This is accomplished by employing an unusually effective stabilizing system which both retards ice crystal formation and facilitates aeration of the product to an unusually low density. This aeration is facilitated by the polyglycerol ester and aliphatic diol ester emulsifiers also employed in the present invention. Aeration also contributes to the retardation of ice crystal formation.

Highly aerated frozen dessert products generally lack the body and consistency characteristic of commercial ice cream. The disadvantages normally associated with high aeration are apparently avoided or compensated for by the use of the stabilizing system of the present invention.

In accordance with the present invention, the stabilizing system comprises five components. These five components interact synergistically with each other and, in combination with the protein solids of the composition, provide the body required to achieve the objects of this invention.

The first component of the stabilizing system of the present invention is citric acid or a salt thereof.

A second component of the stabilizing system of the present invention is tetrasodium pyrophosphate.

A third component of the stabilizing system of the present invention is sodium carboxymethyl cellulose, preferably sodium carboxymethyl cellulose, having a viscosity of from about 500 to about 5000 centipoises (at 25°C and a concentration of from 2% by weight in aqueous solution).

The fourth component of the stabilizing system of the present invention is hydroxypropyl cellulose, preferably a hydroxypropyl cellulose having a viscosity of from about 1500 to about 6500 centipoises (2% concentration in aqueous solution at 25°C).

The fifth component of the stabilizer system of the present invention is Lambda Carrageenan gum.

While it is not wished to be limited by any theory, it is believed that the stabilizing system of the present invention increases the solubility of the protein solids of the present dessert composition at low temperatures by chemically interacting the protein to facilitate and optimize the hydrogen bonding of the water to the protein. For this purpose the stabilizing system of the present invention employes chemical components which have various functional groups, for example, carboxylic, sulphonic, phosphate and hydroxypropyl groups. The use of the stabilizing system of the present invention retards the formation of large ice crystals and the layered or stratifying of the present dessert composition during the freezing process. If the frozen dessert acquires a non-homogeneous, layered or stratified form, it gives the consumer the impression that it is flaky or crumbly. This stabilizing system avoids these undesirable results apparently by orienting or interacting with the protein so that the protein is more available for hydrogen bonding. The result is that the compositions of the present invention are able to comprise relatively high water levels and to incorporate a considerable degree of aeration without corresponding disadvantages of the formation of large ice crystals or lack of body. Thus, the compositions of the present invention provide a low density frozen dessert having relatively high water content without iciness or other ice cream defects.

Polyglycerol esters suitable for use in the present invention have an average of from 2 to 10 glycerol units and from 1 to 3 fatty acyl groups of from 14 to 18 carbon atoms per glycerol moiety. Preferred polyglycerol esters have an average of 2 or 3 glycerol units and 1 fatty acyl group having from 14 to 18 carbon atoms per polyglycerol moiety.

Triglyceride fats may be solid or liquid and are employed in the frozen desserts of the present invention to contribute to the smooth taste, minimize the formation of ice crystals, and to give the full, rich, creamy eating characteristic reminiscent of good commercial ice cream. The fat or oil contributes to the body and melting resistance of the frozen dessert and produces a smoothness of texture and consistency that is difficult to obtain by any other means.

The fat which is used in the compositions described herein must, of course, be edible and can be a solid fat so long as it will melt easily in the mouth thereby not contributing a waxy taste to the frozen dessert when it is eaten. Suitable solid fats will be 85% melted, i.e., have less than 15% solids, at a temperature of 37°C. In general, edible fats and oils suitable for use in this invention contain fatty acids having from 4 to 26, and preferably 8 to 22 carbon atoms. Examples of suitable fats and oils include: cottonseed oil, soybean oil, corn oil, sunflower oil, palm oil, palm kernel oil, peanut oil, olive oil, rice oil, safflower oil, and coconut oil. These fats and oils may be partially or substantially hydrogenated to improve their melting behavior and keeping quality. The fat component of the present invention may consist of fats or oils derived from two or more sources rather than a single source.

Other fats including those of animal origin such as milk fat or marine fats and oils such as are obtained from whale oil, sardine oil, herring oil, and menhaden oil, can be used, provided they have melting points and keeping quality which would give them the desirable properties hereinbefore indicated.

The protein solids which are used in the compositions of this invention are preferably added as nonfat milk solids which are the solids of skim milk and include proteins, mineral matter, and milk sugar. Milk sugars add to the sweet taste of the frozen dessert and proteins aid overrrun. Overrun is a measure of the increase in volume which occurs during the agitation process. Proteins also help to make the frozen dessert smoother and serve as bodying ingredients as well as contributing to the texture and mouth feel of the frozen dessert. The nonfat milk solids increase the effect whipping has on the frozen dessert and increases the viscosity and resistance to melting of the composition. The nonfat milk solids also tend to lower the freezing point of the dessert. The preferred nonfat milk solids for use in this invention are those of the "instant" type. "Instant" refers to the fact that the powders disperse easily and quickly in water or milk without forming lumps. These can be produced by spray drying the solids in a dehydration chamber. Nonfat milk solids may also be supplied by replacement of the water with milk in the mixing process of this invention.

While nonfat milk solids are preferred as the protein source for use in this invention, other proteins may be used. Examples of suitable proteins include: casein, sodium caseinate, calcium caseinate, modified casein, sweet dairy whey, modified whey, whey protein concentrate, soy isolate, soy concentrate, soy flour, modified soy flour, peanut flour, peanut concentrate, corn and other starches. Lactose and mineral salts present in nonfat milk solids can be added separately when other proteins are used.

The saccharides suitable for use in this invention not only have a sweetening effect, but also enhance the creamy flavor or texture of the composition. An insufficient amount of saccharide contributes to an undesirable fatty taste in the composition, while too much saccharide masks the other desirable flavors and may be too sweet. The saccharides also lower the freezing point of the dessert to various degrees, depending on the molecular weights of the particular saccharides used. The preferred saccharide for use in this invention is sucrose; however, sucrose can be mixed with or replaced by other saccharides such as dextrose, fructose, maltose, and corn syrup in dry or syrup form or by artificial sweeteners such as saccharine, the cyclamates, etc. It has been found that the most desirable level of sweetness and texture may be obtained by employing sucrose in combination with a sugar which is less sweet such as dextrose, maltose or low-conversion corn syrup to obtain a relatively great proportion of sugar at a level of sweetness less than that which would result from the use of sucrose alone.

Additional ingredients such as stabilizers, antioxidants, coloring agents, etc. can be added to the frozen dessert product by incorporating said ingredients either into the emulsion of step (a) or into the mixture of ingredients of step (b) either prior to, or during, the aeration step, or prior to, or during, the freezing step.

It will be noted that the final steps necessary to make the frozen dessert, which are contemplated to be carried out by the consumer, are exceptionally tolerant steps. In other words, consumers will be able to easily and conveniently carry out the final steps to obtain frozen dessert products which are of consistently good quality. This is a great advantage in commercially bringing this invention to the consumer. In particular, it should be noted that the compositions of this invention are relatively tolerant to the inclusion of additional ingredients without loss of the advantages of the invention. Additional ingredients can include not only those likely to be added by the consumer, such as strawberries, blueberries, flavorants, etc. but also additional ingredients likely to be incorporated by the manufacturer of the product, such as preservatives, antioxidants, pH buffering agents, nutritional additives, etc.

The process of the present invention (all percentages are percent by weight of the total composition) involves first forming an emulsion by melting from about 0.1% to about 2% of the polyglycerol ester emulsifier with from about 0.1% to about 2% of the diol ester. This melt is then dispersed with high shear and cooling and without aeration, said shearing and cooling being done either simultaneously or in sequence, into an aqueous medium to form an aqueous dispersion, the aqueous medium present in an amount equal to at least twice the weight of the melt. Then a suitable triglyceride is emulsified into the aqueous dispersion. The resulting emulsion should either be aseptically prepared or should have a water activity of less than 0.80 in order to provide microbiological stability. The term water activity is used here in accordance with the definition provided in Frazier, Wm. Carrol, *Food Mirobiology* (2nd Ed.), McGraw-Hill Book Co., New York, 1967. The desired water activity may be obtained by the reduction of the water content or the addition of water-binding ingredients into the emulsion. Suitable additional ingredients include starches, saccharides, corn syrup solids, and lower chain monohydric and polyhydric alcohols, such as ethanol and glycerine.

In forming the emulsion, it is required that the emulsifiers be in liquid form and then subjected to high shear prior to or during cooling. This is necessary to provide the high functionality required of the emulsifiers in the present invention. Then, the additional ingredients which are added to the emulsifiers, for example, fat or oil are preferably added at a temperature below the melting point of the emulsifier crystals. Should a higher temperature be employed there is a tendency to decrease the functionality of the emulsifiers and, hence, limit the degree to which the product can be aerated with stability.

The emulsion is then mixed with the additional ingredients of the present invention and aerated, for example, by whipping with a home mixer at high speed for from about 1 to about 3 minutes. Aeration should be continued until at least 150% overrun is achieved. The term overrun refers to the percentage of increase in volume of the mixture. By making frozen desserts in accordance with the present invention, frozen desserts having densities of from 0.25 to 0.40 specific gravities are obtained.

The aerated mixture is then cooled to below a temperature of −7°C to harden the dessert. While it is contemplated that the dessert will be consumed in its hardened or frozen form, it is an advantage of the present invention that the product is freeze-thaw stable. Thus, the aerated mixture may be frozen, thawed and refrozen to form a product having highly desirable frozen dessert characteristics.

It is a particular advantage of the present invention that the ingredients can be conveniently provided to the consumer in such a way as to make it especially convenient for the consumer to make consistently good frozen dessert products. For example, it is contemplated that a manufacturer provide a kit of two packages for sale to the consumer. The first package contains an emulsion made in accordance with step (a) of the process of the present invention. The second packet comprises the remainder of the ingredients necessary to provide the final product of the present invention except those ingredients which can be supplied by milk or water.

It is contemplated that the consumer would purchase the two packets and then proceed to make a frozen dessert by mixing the ingredients of the two mixes with milk or water, aerating the mixture by whipping with a home mixer for from 1 to 3 minutes and then freezing the aerated mixture in the freezing compartment of a home refrigerator or freezer without agitation.

The following example is intended to illustrate the present invention but not to act as a limitation thereof.

EXAMPLE 1

116 g. of triglycerol monostearate is melted with 5.8 g. of stearic acid soap by heating to a temperature of 104°C. This melt is then placed in a stainless steel beaker with 1180 g. of high fructose corn syrup (Isomerose 100 from the Clinton Corn Processing Company, 581 g. of sucrose and 265 g. of water. This mixture has a temperature of 60°C and is subjected to high shear. The sheared mix is an emulsifier-water dispersion. Then 929 g. of a triglyceride oil (Crisco Oil from The Procter & Gamble Company) which contains 174 g. of propylene glycol monostearate is heated to 50°C and blended in the emulsifier-water dispersion and subjected to additional high shear. The resulting emulsion is then cooled to 32°C and a bourbon vanilla flavor is added with additional high shear. 73 g. of this emulsion is blended in a home mixer running at high speed with 194 g. of milk and 51 g. of a dry mix which contains 21 g. of sucrose, 2.2 g. of dextrose, 5.85 g. of tapioca starch, 20.9 g. of nonfat milk solids, 0.05 g. of coloring agent and 1.0 g. of stabilizing system which contains 0.4 g. of carboxymethyl cellulose (9M31F from Hercules Chemical Co.), 0.1 g. of citric acid, 0.2 g. of tetrasodium pyrophosphate, 0.2 g. of hydroxypropyl cellulose (Klucel variety MF from Hercules Chemical Co.), 0.1 g. of Lambda Carrageenan gum (Viscarin 402 from Marine Colloids Co.). The resulting aerated mixture has a density of about 0.31 specific gravity. The aerated mixture is then placed in a freezing compartment of a refrigerator at a temperature of about 0°C for about 7 hours. The resulting product is a frozen dessert which has the texture and appearance similar to commercial ice cream.

What is claimed is:
1. A frozen dessert composition comprising:
   a. from about 3% to about 10% protein solids;
   b. from about 10% to about 25% saccharides;
   c. from about 3% to about 15% of a triglyceride fat;
   d. from about 0.1% to about 2% of a polyglycerol fatty acid ester emulsifier;
   e. from about 0.1% to about 2% of a fatty acid ester of an aliphatic diol having from about 3 to about 5 carbon atoms;
   f. from about 0.005% to about 0.10% of an anionic emulsifier;
   g. from about 0.05% to about 0.5% of a stabilizing system comprising:
      1. from about 5 parts to about 20 parts per 100 parts of the stabilizing system of citric acid or a salt thereof;
      2. from about 15 parts to about 35 parts per 100 parts of said stabilizing system of tetrasodium pyrophosphate;
      3. from about 25 parts to about 65 parts per 100 parts of the said stabilizing system of carboxymethylcellulose;
      4. from about 10 parts to about 30 parts per 100 parts of said stabilizing system of hydroxypropyl cellulose; and
      5. from about 5 parts to about 20 parts per 100 parts of said stabilizing system of Lambda Carrageenan gum;
   h. from about 55% to about 65% water.
2. The composition of claim 1 wherein said protein solids are added as nonfat milk solids.
3. The composition of claim 1 wherein said saccharides are selected from the group consisting of fructose, dextrose, sucrose and mixtures thereof.
4. The composition of claim 1 wherein said triglyceride fat is partially hydrogenated soybean oil.
5. The composition of claim 1 wherein said polyglycerol fatty acid ester has an average of 2 or 3 glycerol units and is a monoester of a fatty acid having from 14 to 18 carbon atoms.
6. The composition of claim 1 wherein said fatty acid ester of an aliphatic diol is selected from the group consisting of propylene glycol monostearate, propylene glycol monopalmitate, and mixtures thereof.

* * * * *